BLOCK DIAGRAM OF SPEED CONTROL SYSTEM

INVENTOR.
RICHARD F. WOOD
BY
D. R. Pressman
ATTORNEY

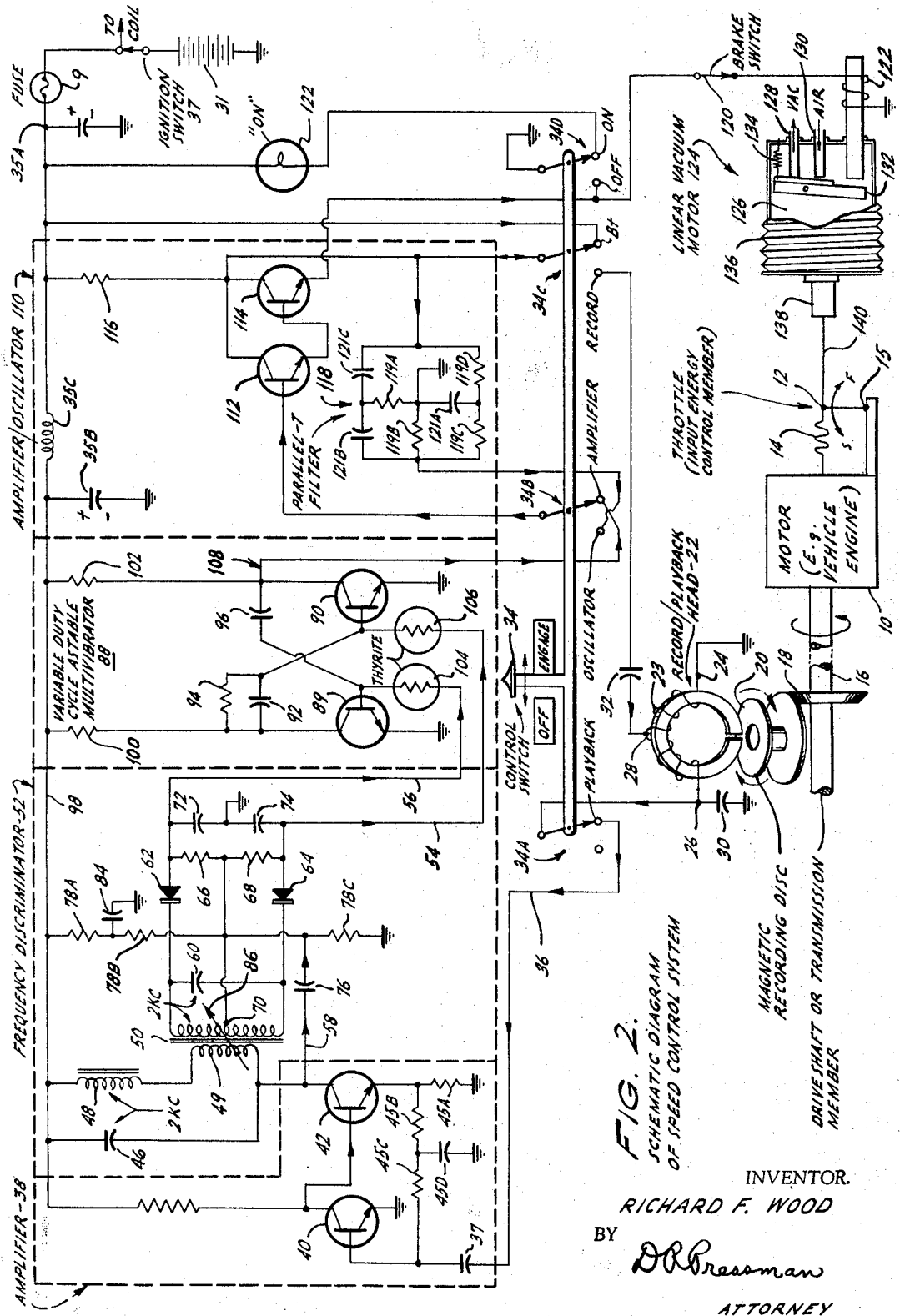

United States Patent Office 3,388,764
Patented June 18, 1968

3,388,764
ELECTRONIC VEHICLE SPEED MAINTAIN-
ING SYSTEM AND ASSOCIATED CONTROL
CIRCUITRY
Richard F. Wood, Marlton, N.J., assignor to Philco-
Ford Corporation, Philadelphia, Pa., a corporation
of Delaware
Filed Sept. 22, 1965, Ser. No. 489,215
19 Claims. (Cl. 180—105)

ABSTRACT OF THE DISCLOSURE

Motor vehicle speed maintaining system employing magnetic head for continuous recording of fixed-frequency signal on endless track driven according to vehicle's speed, with engage switch for connecting head to supply last-recorded signal to a servo for controlling throttle position. Servo control employs frequency discriminator to control duty cycle of astable multivibrator which regulates vacuum level in throttle-positioning linear motor.

Figure 1:
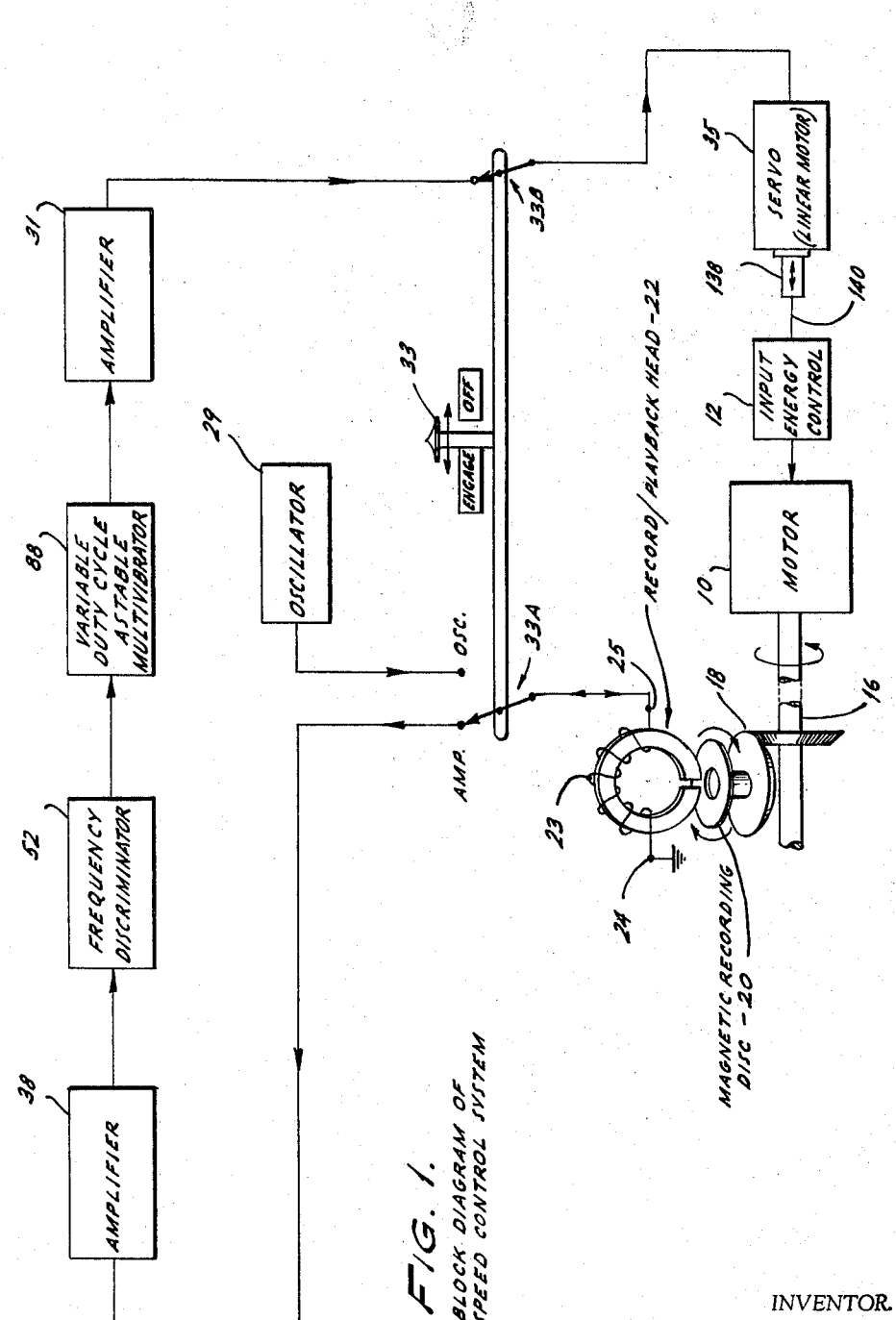

This invention relates to motor speed control systems, and more particularly to a control system which can be used to maintain the speed of a motor or a motor vehicle driven by the motor substantially constant despite variations in the load encountered by said motor or motor vehicle. The system will be described for exemplary purposes with reference to a motor vehicle speed control system; however the invention is not limited to this application except where recited in the appended claims.

Early motor vehicle speed control devices took the form of a manually adjustable throttle control which is set to provide a desired average speed. Manual throttle controls, however, are unable to compensate for various load or other conditions such as hills, wind, and atmosphere which are encountered by motor vehicles.

Recently, automatic speed control devices have appeared. These usually comprise mechanical servomechanism devices which operate by feedback control to maintain the speed of an automobile substantially constant despite variations in load of the type aforementioned. A brief description of the presently existing types of automatic cruise control devices is given in the periodical Car Life for October 1964, pages 69 to 72. These devices, however, have many disadvantages. Foremost is the fact that they are relatively complicated and embody complex mechanisms such as flyball governors, electric motors, and special speedometers. Another disadvantage of these devices is that they include a separate dashboard speed-calibrated dial which must be set to the speed at which it is desired to cruise. These dials are driver distracting and may not correspond accurately to the motor vehicle's speedometer.

In the copending application of A. Hopengarten, entitled Motor and Motor Vehicle Speed Maintaining System Using Recorded Signal Servo Control, Ser. No. 446,629, filed Apr. 8, 1965, now Patent No. 3,340,950, and assigned to Philco-Ford Corporation, the assignee of the present invention, there is described an electronic speed control system which overcomes the disadvantages of these prior art speed control systems. According to Hopengarten's invention, a member carrying a circular magnetic track is coupled to an output shaft of the motor vehicle whose speed is to be controlled. The track is continuously supplied with an "erase" signal to maintain it in an erased condition. When the vehicle is travelling at the speed desired to be maintained, the erase signal is interrupted and a signal of a predetermined frequency is recorded on the track. Means are provided for terminating this recording operation when the signal is recorded on the entire length of the track. A pickup lead coupled to the track then translates the recorded signal into electrical form; the frequency of this signal will be proportional to the actual speed of the vehicle. Servo means are provided for controlling the energy supplied to the vehicle's motor in inverse proportion to the frequency of the signal supplied by the pickup head; this will maintain the vehicle's speed substantially constant despite variations in load encountered.

While Hopengarten's system is able to control speed without expensive and complex mechanical components, auxiliary dashboard dials, or any of the other numerous drawbacks of prior art devices, it requires a separate erase signal oscillator, a special circuit to disable the record signal oscillator after the signal therefrom is recorded on the entire track, and separate pickup and record erase magnetic heads. Certain difficulties are encountered when it is desired to change to a new controlled speed. The speed control system of the present invention does not require the abovementioned circuit components and can be readily changed to maintain a new controlled speed.

OBJECTS

Accordingly, several objects of the present invention are (1) to provide a novel and improved automatic motor speed control device; (2) to provide an automatic speed control device which is substantially all electronic in operation; (3) to provide a motor vehicle speed control device which does not incorporate auxiliary speed calibrated dashboard dials and which may be set or engaged by a driver without taking his eyes from the road; (4) to provide an automatic speed control device which utilizes magnetic recording techniques including a single recording head and a single oscillator; and (5) to provide an electronic speed control device of simplified and improved operation.

Another object of the present invention is to provide novel and useful electronic circuitry for use in automatic speed control devices and for use in other applications.

Further objects and advantages of the present invention will become apparent from a consideration of the ensuing description thereof.

SUMMARY

According to the present invention a magnetic track is driven by a rotatable member, the speed of which is to be controlled; the drive is such that the speed of the magnetic track is always proportional to the speed of the rotatable member. A record/playback head is magnetically coupled to said track. Means are provided for supplying the output of a fixed frequency oscillator to said head so that whenever the member is rotating, a signal will be recorded on said track. The wavelength of the signal recorded on the track will be proportional to the actual speed of the member during recording. When it is desired to engage the automatic speed control device, the oscillator is disconnected from the record playback head and an output signal from said head is coupled to a frequency responsive control circuit whose output is arranged to control energy supplied to the drive source for the rotatable member according to the frequency of the signal supplied by the playback head. When the speed control is employed in a motor vehicle, the rotatable member may be the driveshaft of the motor vehicle and the frequency responsive control circuit may control the position of the throttle of the engine.

DRAWINGS

FIG. 1 is a block diagram of the present invention.
FIG. 2 is a schematic diagram which corresponds to the system shown in FIG. 1.

FIG. 1—DESCRIPTION

In the motor vehicle speed control system of FIG. 1, the motor of the vehicle whose speed is to be controlled is represented by block 10. A throttle or input energy control means for motor 10 is represented by block 12. Means are provided within energy control means 12 so that in the absence of an input thereto a minimum of energy or fuel will be supplied to motor 10. Motor 10 is arranged to drive an output shaft 16 which may represent the drive shaft or a transmission component of the vehicle. Shaft 16 may be any member which has a speed proportional to the ground speed of the vehicle to be controlled. In the case of a motor vehicle having an automatic transmission or a fluid torque converter, wherein motor speed may not be proportional to the speed of the vehicle, shaft 16 represents the output shaft of such automatic transmission rather than the shaft of the engine itself.

Connected to shaft 16 by suitable mechanical coupling means 18 is a magnetic recording disc 20. Disc 20 may have an endless circular magnetic track on the periphery thereof. Other types of recording media providing endless recording tracks (e.g., drums) can be used in lieu of disc 20. In the case of an automobile, a convenient way of attaching disc 20 to the drive train of the vehicle is to employ the drive connection normally provided for the speedometer. The housing for disc 20 may have a drive coupling which can be connected to the speedometer cable socket on the transmission of the automobile and a socket to receive the speedometer cable. The speedometer cable can be unscrewed from its transmission socket and reconnected to the socket provided on the housing for disc 20.

A record/playback head 22, which is comprised of a magnetic member forming a closed magnetic loop except for a small gap and which has a coil 23 wound thereon, is placed with the gap adjacent the magnetic track of disc 20. The coil 23 of head 22 has end terminals 24 and 25. End terminal 24 is a common terminal which is connected to ground or a point at reference potential, and end terminal 25 is an input/output terminal. When section 33A of switch 33 is in the "OSC" position, terminal 25 will be connected to an oscillator 29 which is arranged to supply a signal of a given frequency, e.g. 2 kc., thereto. When section 33A is in the "AMP" position, end terminal 25 will supply a signal derived from the signal recorded on disc 20 to the input of amplifier 38 via switch 33A.

Amplifier 38 is conventional; its output is supplied to a frequency discriminator 52. The output of discriminator 52 will be a direct voltage whose amplitude is proportional to the frequency of the output of amplifier 38. A variable duty cycle astable multivibrator 88 is arranged to receive the output of discriminator 52 and supply a pulse train waveform whose duty cycle is proportional to the output of discriminator 52. Amplifier 31, which is also conventional, is arranged to supply an amplified version of the output of multivibrator 88, via section 33B of switch 33, to a servo device 35.

Servo 35 is a linear motor having an adjustable output member 138 which is physically connected to input energy control means 12 by a linkage 140. In practice input energy control 12 will include means, such as a spring, which tends to urge member 138 in a direction, e.g., the left, wherein less energy is supplied to motor 10. Servo 35 operates to pull member 138 in the opposite direction, e.g., to the right, with a force proportional to the duty cycle of the signal supplied thereto from amplifier 31. It will be apparent from the foregoing that the energy supplied to motor 10 will be proportional to the duty cycle of the signal supplied to servo 35.

The system components are arranged so that when the signal supplied to amplifier 38 has the same frequency as the output signal from oscillator 29, discriminator 52 will provide an output which will cause the output of multivibrator 88 to have a 50% duty cycle. Servo 35 is adjusted so that when the signal supplied thereto has a 50% duty cycle, the position of member 138 will be such that the speed of motor vehicle will be about in the center of its controllable cruising range, under normal load conditions, say 60 m.p.h.

Switch 33, which includes switch sections 33A and 33B as noted, has OFF and ENGAGE positions. When switch 33 is in the ENGAGE position, the coil 23 of head 25 is connected to the input of amplifier 38 and the output of amplifier 31 will be connected to servo 35. When switch 33 is in the OFF position, the output of oscillator 29 will be supplied to coil 23 and the input of servo 35 will be disconnected from amplifier 31.

FIG. 1—OPERATION

The operation of the FIG. 1 system will be described by detailing its operation prior to, during, and after initiation of an automatic speed control operation.

Assume that the device is installed in a motor vehicle as described and said motor vehicle is travelling at a given rate of speed, say 50 m.p.h., which is desired to be maintained automatically. Initially, switch 33 will be in the OFF position so that oscillator 29 will supply a 2 kc. signal via switch section 33A to head 22 which will record this signal on disc 20. Disc 20 will be moving past head 22 at a speed proportional to the speed of the motor vehicle. According to the invention, whenever switch 33 is in the OFF position a signal is continuously being recorded on the magnetic track of disc 20 so that the wavelength on said track of the last recorded signal will be proportional to the actual speed to the motor vehicle. The output of oscillator 29 should have sufficient amplitude to cause head 22 to continuously "record over" previously-recorded signals.

In order to initiate an automatically controlled speed operation, the driver will throw switch 33 to the ENGAGE position and remove his foot from the throttle. Oscillator 29 will be disconnected from head 22 and the signal which was last recorded on disc 20 will be supplied, via head 22, switch section 33A, and amplifier 38, to the input of discriminator 52. The output of discriminator 52 will initially cause multivibrator 88 to oscillate wtih a 50–50 duty cycle. The output signal of multivibrator 88 will be fed, via amplifier 31 and switch 33B to servo 35.

Accordingly the 50% duty cycle signal initially supplied to servo 35 will initially tend to adjust member 138 to a position wherein the motor vehicle will travel at the selected midrange speed, in this example 60 m.p.h. Thus the vehicle's speed will begin to increase slightly, but as soon as it does, the signal supplied by head 22 will increase in frequency to a value above 2 kc. Consequently the output of discriminator 52 and multivibrator 88 will change and will cause a different duty cycle signal (less than 50%) to be supplied to servo 35, whereby member 138 will be adjusted to a slower postion and the speed of the vehicle will remain close to the set speed of 50 m.p.h. in accordance with servomechanism principles.

Next assume that the automobile with the speed control set at 50 miles per hour proceeds up a hill. The load of the hill will slow the automobile, causing the output signal from head 22 to be reduced in frequency. This will cause the potential of the output of discriminator 52 to change the duty cycle of multivibrator 88 and the signal supplied servo 35. Servo 35 will pull member 138 toward a position wherein more energy is supplied to motor 10. Motor 10 will supply more output power to compensate for the load of the hill and maintain the automobile's speed close to 50 miles per hour, again in accordance with servomechanism principles.

If instead of proceeding up a hill, the automobile encounters a downgrade, the frequency of the output signal from head 22 will increase and the duty cycle of the signal supplied to servo 35 will decrease, causing the position of member 138 to be adjusted toward a position wherein less energy will be supplied to motor 10.

If the speed control is engaged at a speed higher than 60 m.p.h., say 70 m.p.h., it will be apparent that member 138 will initially tend to be adjusted toward a slower position when the driver removes his foot from the accelerator. The frequency of the signal supplied by head 22 will begin to decrease initially, but servo feedback action will resist this change and maintain the automobile's speed close to 70 m.p.h.

The speed control system of the present invention provides substantial advantages over the various types of speed control system described in the aforenoted Car Life article. To set a given speed the driver merely has to attain that speed manually, engage switch 33, and remove his foot from the accelerator. If the driver meets obstructions on the road or any other condition necessitating a temporary increase or decrease in speed he merely will adjust manually the accelerator pressure or engage the brake, as required. If the brake is engaged, the output of the vehicle's hydraulically-operated brakelight switch may be used to disable the servo system during braking operations. Also similar means may be provided to disable the speed control system when a clutch or neutral operation is effected. If a temporary increase in speed is required, the driver can manually overide servo 35 and move the accelerator toward a faster position; member 138 will be moved to the right with insignificant resistance.

If a temporary change in speed is required and the magnitude of the change is such that the output signal from head 22 will be outside the operating range (bandpass) of discriminator 52, the system will become inoperative at the temporary speed. The driver will then manually readjust the vehicle's speed (e.g., by braking or accelerating) until it is close enough to the initially set speed so that the frequency of the signal supplied by head 20 will be within the bandpass of discriminator 52. The bandpass of discriminator 52 can be adjusted as desired, but a bandpass equivalent to a speed range of ±15 m.p.h. from the set speed was found desirable.

The automatic speed control device of the present invention is not limited to a motor vehicle speed control application but may also be utilized to control the speed of any motor which is subject to a variety of load conditions. For example, alternatively motor 10 may represent an electrical motor and input energy control member 10 may represent means, either of the electronic or manual-electrical type, for controlling the current or voltage supplied to motor 10. Motor 10 may also represent a diesel engine, a steam engine, or any other device for converting energy of a type other than rotational to rotational energy. In all cases member 12 represents input energy control means for the motor. However for simplicity of description only the motor vehicle speed control embodiment is detailed herein.

FIG. 2—DESCRIPTION

FIG. 2 is a schematic diagram of a speed control device which corresponds generally to the system shown in block form in FIG. 1. The system of FIG. 2 differs from that of FIG. 1 in that oscillator 29 and amplifier 31 have been combined as a dual function circuit 110 for purposes of economy, a centertap terminal 28 on coil 23 of head 22 is utilized for impedance matching purposes, and switch 33 has been changed to a more complex switch 34 to accommodate these changes.

End tap terminal 26 of coil 23 is connected to ground by a capacitor 30 which is designed to resonate with the inductance of coil 23 at the frequency (2 kc.) of the oscillator in circuit 110. End tap 26 constitutes an output terminal of coil 23 and is arranged to supply the signal recorded on disc 20 to the input of amplifier 38 via switch 34A and lead 36. Centertap terminal 28 of coil 23 constitutes a lower impedance input terminal which is arranged to receive the 2 kc. output signal from the oscillator part of circuit 110, via switch 34C and coupling capacitor 32, thereby to record said signal on disc 20 when switch 34 is in the OFF position.

Switch 34 consists of four separate contact arms, 34A–34D. When switch 34 is in the OFF position, contact arm 34A will be open, preventing any output from head 26 from reaching amplifier 38; contact arm 34B will be in the OSCILLATOR position in which amplifier/oscillator circuit 110 is connected to operate as an oscillator; contact arm 34C will be in the RECORD position, in which the oscillator's output will be supplied to the input or record terminal 28 of head 22; and contact arm 34D will be in the OFF position, which also connects circuit 110 to operate as an oscillator and prevents any output from the oscillator from reaching the linear vacuum motor 124.

Switch 34 is shown in the ENGAGE position; in this position contact arm 34A is in the PLAYBACK position wherein the output of head 22 is supplied to amplifier 38; contact arm 34B is in the AMPLIFIER position wherein the output of multivibrator 88 is supplied to circuit 110 which is connected to operate as an amplifier; contact arm 34C is in the "B+" position, which also connects circuit 110 to operate as an amplifier and disconnects the amplifier's output from head 22; and contact arm 34D is in the ON position, allowing the amplifier's output to be supplied to motor 124 and grounding one terminal of "ON" indicator 122 to energize the same.

The system of FIG. 2 is powered by a voltage source 31, which may represent the 12 volt storage battery of the motor vehicle. Source 31 is connected to the system via an OFF-ON switch 37, which may be the vehicle's ignition switch, and a fuse 9. Suitable filtering is provided by capacitors 35A and 35B and choke 35C to keep undesirable voltage fluctuations out of the system and to prevent undesired internal feedforward or feedback across voltage source 31.

Amplifier 38

Amplifier 38 comprises a two stage, high gain amplifier with stabilizing feedback which receives an input signal on lead 36 and which supplies an output across the primary winding of a transformer 50. Amplifier 38 comprises 2 transistors, 40 and 42, each of which is connected in the common emitter configuration. The base of transistor 40 is connected to lead 36 via capacitor 37 and the collector thereof is directly coupled to the base of transistor 42. Transistor 42 has an emitter resistor 45A, the upper terminal of which is connected, via a stabilizing feedback circuit comprising resistors 45B and 45C, and capacitor 45D, to the base of transistor 40. The collector of transistor 42 is connected to B+ lead 98 via the tuned primary circuit of transformer 50, which is part of discriminator 52. The tuned primary circuit (2 kc.) comprises capacitor 46 and inductor 48, which are link-coupled to the secondary by winding 49 connected in the collector circuit of transistor 42. Also another output from the collector of transistor 42 is supplied to discriminator 52 via lead 58.

Frequency discriminator 52

Frequency discriminator 52 is standard frequency discriminator which is double-tuned to 2 kc. The tuned primary circuit of transformer 50 is connected to the output of amplifier 38. The secondary of transformer 50 has a centertap terminal 70 which is connected to the amplifier output lead 58 via a coupling capacitor 76. The secondary is tuned to 2 kc. by a capacitor 60. A pair of diodes 62 and 64 also have their cathodes connected to the respective end terminals of said secondary winding. A pair of load resistors 66 and 68 are connected to the respective anodes of diodes 62 and 64 and are also connected in common to the centertap terminal 70. A pair of filter capacitors 72 and 74 are also connected between the respective output leads 54 and 56 and ground. A bias circuit comprising resistor 78A, 78B, and 78C is connected to the B+ lead 98, to centertap terminal 70, and to ground as indicated. A bypass capacitor 84 is connected from the junction of resistors 78A and 78B to ground. The core inductance of transformer 50 is preferably made adjustable as indicated by arrow 86 so that the discriminator will be tunable.

The operation of the frequency discriminator 52 is standard and well known in the art. Briefly, when a 2 kc. signal is applied to the tuned primary circuit 46–48, this signal will appear across diodes 62 and 64 out-of-phase by 90° with the signal supplied to centertap terminal 70 via lead 58. Thus the same positive voltages will appear across the diode load resistors 66 and 68. Due to filter capacitors 72 and 74, these positive voltages will appear as substantially smooth direct positive voltages of equal magnitude on discriminator output leads 54 and 56. If, however, the frequency applied to the tuned circuit deviates from the 2 kc. value in either direction, the signal appearing across the secondary winding will deviate in phase from the signal applied to the centertap so that addition of these two signals across diodes 62 and 64 will result in unequal positive voltages across resistors 66 and 68. Thus when the frequency deviates to a higher value than 2 kc., the positive voltage on one of the leads 54 and 56 will rise and the voltage on the other of these leads will fall in proportion to the amount of actual frequency deviation. If the frequency deviation is in a negative direction the reverse of this will occur.

*Variable duty cycle astable multivibrator 88*

Variable duty cycle astable multivibrator 88 comprises two capacitively crosscoupled transistor inverting amplifiers. The collector of transistor 89 is coupled to the base of transistor 90 via the parallel circuit consisting of capacitor 92 and resistor 94. The collector of transistor 90 is capacitively coupled to the base of transistor 88 via capacitor 96. Resistor 94 has a very high value and is used merely to maintain transistor 90 conductive when no output is supplied from discriminator 52, thereby insuring that multivibrator will not supply an output when none is supplied by discriminator 52. The collectors of transistors 89 and 90 are connected to B+ lead 98 via respective load resistors 100 and 102. The bases of transistors 89 and 90 are connected to output lines 56 and 54 of discriminator 52 via respective voltage sensitive impedances 104 and 106. Impedances 104 and 106 have a negative voltage coefficient of resistivity so that their resistance decreases for greater applied voltages. Impedances 104 and 106 are usually fabricated of silicon carbide and are available commercially under the trade name "Thyrite." An output lead 108 connects the collector of transistor 90 to the AMPLIFIER terminal of switch 34B.

Multivibrator 88 oscillates at a frequency of about 25 cycles per second and has a 50–50 duty cycle when the control voltages supplied thereto via leads 54 and 56 from discriminator 52 are equal. However, when the voltage of one of leads 54 and 56 rises and the voltage of the other of these leads falls, the base voltage of one of transistors 89 and 90 will rise and the other will fall slightly. This will cause one transistor to be conductive for a larger portion of the cycle and the other transistor to be conductive for a shorter portion of the cycle. It will thus be apparent that the duty cycle of multivibrator 88 will be controlled by the output of discriminator 52, which in turn is controlled by the frequency of the signal supplied thereto from amplifier 38.

A further advantageous feature of the invention is obtained by using voltage sensitive impedances 104 and 106 in series with leads 54 and 56. These impedances allow the duty cycle sensitivity of multivibrator 88 to be increased greatly, i.e., the use of impedances 104 and 106 will provide a greater change in duty cycle of multivibrator 88 for a given change in voltage on leads 54 and 56 than if ordinary resistors were used in place of impedance elements 104 and 106. This is due to the fact that the resistances of impedances 104 and 106 will be inversely proportional to the voltage on leads 54 and 56, thereby effectively amplifying any change in voltage on these leads.

*Amplifier/oscillator 110*

Amplifier/oscillator circuit 110 may operate either as an amplifier or as an oscillator depending upon the position of switch 34. When switch 34 is in the ENGAGE position, circuit 110 is an amplifier, but when switch 34 is in the OFF position, circuit 110 acts as an oscillator. Circuit 110 comprises two transistors, 112 and 114, which are cascade-connected in the Darlington configuration in order to provide high voltage gain. The collectors of transistors 112 and 114 are commonly connected, via a load impedance 116, to the B+ line 98. The base of transistor 112 is connected to contact arm 34B and the emitter of transistor 114 is connected to the OFF terminal associated with contact arm 34D. The collector of transistor 114 is connected to one side of the parallel-T filter circuit 118 and to contact arm 34C.

The parallel-T circuit 118 includes resistors 119A, 119B, 119C, 119D, and capacitors 121A, 121B, and 121C connected as indicated. Base bias for transistor 112 is provided by the voltage divider comprising resistors 119B, 119C, and 119D. The parallel-T circuit provides a 180° phase shift for signals of a particular frequency and is described in the Proceedings of the IRE for June 1943, page 258. The other side of filter circuit 118 is connected to the OSCILLATOR terminal of contact arm 34B.

When switch 34 is in the ENGAGE position, circuit 110 will act as an amplifier and the output of multivibrator 88 will be connected, via contact arm 34B, to the input of amplifier 110. Also in this position the output of circuit 110, which is taken from the emitter of transistor 114, is connected, via a brake actuated switch 120, to one side of coil 122, the other side of this coil being connected to ground.

When switch 34 is in the OFF position the output terminal of filter 118 will be connected, via contact arm 34B, to the base of transistor 112 so that the circuit will act as an oscillator. Also the output of circuit 110 will be connected, via contact arm 34C and capacitor 32, to the coil of head 22. When switch 34 is in the OFF position, the grounded contact arm 34D will be connected to the OFF terminal, thereby grounding the emitter of transistor 114.

When circuit 110 is connected to operate as an amplifier, the voltage on B+ lead 98 will be connected to the collector of transistors 112 and 114 via contact arm 34C. The input signal supplied to the base of transistor 112 from multivibrator 88 via contact arm 34B will be amplified by transistors 112 and 114 so that a current, proportional to the collector voltage of transistor 90, will be supplied from the emitter of transistor 114 to coil 122 of motor 124.

When circuit 110 is connected to operate as an oscillator the collector of transistor 114 will be connected, via the parallel-T filter 118 and contact arm 34B, to the base of transistor 112. A parallel-T 2 kc. oscillator, such as described in the aforementioned Proceedings of the IRE article, will be provided. The output of this oscillator will be connected, via contact arm 34C and capacitor 32, to input terminal 28 of head 22.

*Linear vacuum motor 124*

Linear vacuum motor 124 corresponds to servo 35 of FIG. 1.

Motor 124 consists of a vacuum chamber 126 having a vacuum port 128 and an atmospheric port 130. Vacuum port 128 may be connected to any convenient vacuum source such as the intake manifold of motor 10. Inside of chamber 126 is a pivotal valve member 132, which, when coil 122 is unenergized, is biased by spring 134 to a position closing vacuum port 128. When coil 122 is energized, the magnetic field created by the core thereof will urge member 132 to its alternative position wherein vacuum port 128 is opened and atmospheric port 130 is closed.

Vacuum chamber 126 is enclosed at one end thereof by a bellows arrangement 136 which has an end member 138 whose position is adjustable according to the degree of vacuum in chamber 126. Member 138 is connected to throttle 12 via linkage 140.

The operation of linear vacuum motor 124 is such that when a 50% duty cycle signal is supplied to coil 122, member 132 will be caused to oscillate in a symmetrical fashion, dwelling an equal proportion of time on vacuum port 128 and atmospheric port 130. The pressure in chamber 126 will thus be between that of the vacuum source and the atmosphere, thereby creating a force tending to pull member 138 to the right in opposition to the force exerted by spring 14. It will be apparent from the foregoing that if the duty cycle of the signal supplied to coil 122 is greater or lesser than 50%, the force on member 138 will be respectively greater or lesser than the 50% value. As stated before, the system parameters should be adjusted so that, in response to the 50% duty cycle signal, throttle 12 will be adjusted to a position in the center of the desired controllable range (e.g., 60 m.p.h.).

*Components used*

The values, identifications, or descriptions of the individual components used in the system are as follows:

Resistors:                                                                 Ohms
45A _____ 560
45B, 45C _____ 33K
66, 68, 78B, 78C _____ 39K
78A _____ 6.8K
94 _____meg__ 1.5
100, 102 _____ 4.7K
104, 106 (Thyrite) _____ 250K
116 _____ 220
119A _____ 8.8K
119B _____ 10K
119C, 119D _____ 22K Capacitors (μf.=microfarads) (nf.=nanofarads):
30, 37 _____μf__ .01
32, 72, 74, 84 _____μf__ .47
35A _____μf__ 250
35B _____μf__ 500
45D, 76 _____μf__ .1
46 _____μf__ .047
60 _____μf__ .015
92, 96 _____μf__ .068
121A _____nf__ 10
121B, 121C _____nf__ 4

Semiconductors:
40, 42 (Fairchild) _____ SE 4001
89, 90 _____ SE 4002
112 _____ SE 6000
114 _____ SE 8000
62, 64 _____ FD 100

Miscellaneous:
 Inductor 48: 5.3 h.
 Head 22: Coil res. 600 ohms; tap 28 @ 200 ohms; head-to-disc spacing: .002"; head gap: .0125".
 Disc 20: Dia. 2.125"; matl.: Delrin plastic; magnetic track: ferric gamma oxide in resinous binder, .002" thick.
 Fuse 9: 3 a.

FIG. 2—OPERATION

The operation of the system of FIG. 2 is similar to that of FIG. 1. When switch 34 is OFF, the 2 kc. signal generated by circuit 110 will be continually recorded and re-recorded on disc 20. When switch 34 is set to ENGAGE, the wavelength on the magnetic track of disc 20 of the last-recorded signal will be proportional to the instant speed of the vehicle. This signal will be supplied in electrical form to the electronic components (amplifier 38, discriminator 52, multivibrator 88, and circuit 110) which will convert it to a variable duty cycle signal suitable for adjusting linear motor 124, which will in turn adjust throttle member 12 to maintain the vehicle's speed substantially constant, in accordance with servomechanism principles.

If the motor vehicle should, for example, encounter an upgrade, its speed will begin to decrease and the signal supplied by head 22 to amplifier 38 will decrease from the nominal 2 kc. value. The outputs of discriminator 52 will become unbalanced, causing the duty cycle of the output signal of multivibrator 88 to become asymmetrical. This signal, after amplification in circuit 110, will cause oscillating valve member 13 to dwell on air intake 130 a greater percentage of time, causing the pressure in chamber 126 to decrease. Member 138 will be adjusted to the right, thereby moving throttle 12 to a position wherein more fuel will be supplied to motor 10. Motor 10 will thus supply more torque to shaft 16 to maintain the speed thereof substantially at the set value.

The system as shown was installed in a motor vehicle and was able to maintain satisfactorily all speeds from 30 to 90 m.p.h. within a 2 m.p.h. range for all normal load conditions.

It will be understood that within the scope of the invention alternative means can be used to adjust the position of input energy control member 12 in accordance with the frequency of the signal supplied by head 22. For example an FM detector supplied with the signal from head 22 could be used to variably energize a solenoid connected to member 12. Therefore the particular frequency-to-position conversion means shown should not be considered limiting, except where recited in the appended claims.

Also, while there has been described what are at present considered to be preferred embodiments of the invention, it will be apparent that various modifications and other embodiments thereof will occur to those skilled in the art within the scope of the invention. Accordingly, it is desired that the scope of the invention be indicated by the appended claims only.

I claim:

1. A motor vehicle speed maintaining system, comprising, in combination:
 (a) a motor vehicle including a propulsion motor having an input energy control member,
 (b) means arranged to receive a control signal and adjust the position of said member in accordance with the frequency of said signal,
 (c) means for supplying a reference signal of a given frequency,
 (d) magnetic recording means including an endless magnetic track and a read-record head magnetically coupled to said track, said track being driven by said motor vehicle at a speed proportional to the speed of said motor vehicle, and
 (e) means for alternatively (1) supplying said signal of said given frequency to said read-record head, or (2) coupling said read-record head to said means arranged to receive said control signal, whereby the speed of said motor vehicle can be maintained substantially at an existing value automatically.

2. The combination of claim 1 wherein said means arranged to receive a control signal comprises a discriminator arranged to supply at least one output voltage having a magnitude proportional to the frequency of said control signal supplied thereto, an oscillator coupled to said discriminator and arranged to supply an output signal having a duty cycle proportional to the magnitude of said output voltage, and means coupled to said oscillator and arranged to adjust the position of said energy control member in accordance with the duty cycle of said output signal.

3. The combination of claim 2 wherein said oscillator is an astable multivibrator which includes two cross coupled inverting amplifiers, the input of at least one of said inverting amplifiers being connected to an output of said discriminator via a voltage sensitive impedance.

4. A motor vehicle speed maintaining system, comprising, in combination:
   (a) a source of a signal of a given frequency,
   (b) a magnetic recording system including a circular endless magnetic track and a record/playback head for recording a signal on said track and reproducing the signal recorded,
   (c) a motor vehicle including (1) a propulsion motor having an input energy control member and (2) means for rotating said magnetic track at a speed proportional to the speed of said motor vehicle,
   (d) first means for receiving an electrical signal and adjusting the position of said member in accordance with the frequency of said signal, and
   (e) second means for selectively supplying said signal of said given frequency to said record/playback head or coupling said record/playback head to said first means, whereby the speed of said motor vehicle can be maintained substantially at an existing value automatically.

5. The combination of claim 4 wherein said second means comprises a frequency discriminator, a variable duty cycle astable multivibrator coupled to the output of said discriminator such that the duty cycle of the output signal of said multivibrator is a function of the amplitude of the output of said discriminator, and third means for adjusting the position of said energy control member in accordance with the duty cycle of the output of said multivibrator.

6. The combination of claim 5 wherein the output of said discriminator is coupled to the input of said multivibrator via a voltage sensitive impedance, whereby the duty cycle sensitivity of said multivibrator is enhanced.

7. The combination of claim 4 wherein said motor is a vehicle engine and said recording track is physically coupled to a driveshaft of said engine, whereby the speed of said vehicle can be controlled.

8. A motor vehicle speed maintaining system, comprising, in combination:
   (a) a motor vehicle including a propulsion motor having an input energy control member,
   (b) first means, arranged to receive a control signal, for adjusting the position of said member in accordance with the frequency of said signal such that the amount of energy supplied to said motor is inversely proportional to the frequency of said signal,
   (c) second means, including an endless magnetic recording track, coupled to said motor vehicle such that the speed of said track is proportional to the speed of said motor vehicle,
   (d) a record/playback head functionally coupled to said track,
   (e) third means for supplying a reference signal of a given frequency, and
   (f) means for alternatively supplying said reference signal to said record/playback head or coupling the output of said head to said first means, whereby the speed of said motor vehicle can be maintained substantially at an existing value automatically.

9. The combination of claim 8 wherein said first means comprises a discriminator for providing a signal whose amplitude is proportional to an input signal, a variable duty cycle multivibrator for providing an output signal whose duty cycle is proportional to the signal supplied by said discriminator, and means including a bellows chamber having vacuum and atmospheric ports for adjusting the position of said energy control member in accordance with the duty cycle of said output signal of said multivibrator.

10. A motor vehicle speed control system, comprising, in combination,
   (a) a motor vehicle, the motor of said vehicle having a fuel control throttle,
   (b) first means, including a movable endless magnetic track, coupled to a rotatable member in said motor vehicle such that the speed of said track is proportional to the speed of said vehicle,
   (c) a record/playback head arranged to (1) receive a reference signal of a given frequency and magnetically record said signal on said track such that the wavelength of the signal recorded on said track is proportional to the speed of said track during recording, and (2) reproduce in electrical form the signal recorded on said track such that the frequency of the signal reproduced is proportional to the speed of said track during reproduction,
   (d) an oscillator arranged to supply said reference signal of said given frequency,
   (e) second means arranged to receive a control signal and adjust the position of said throttle in accordance with the frequency of said control signal such that the amount of fuel which can be supplied to said motor is inversely proportional to the frequency of said control signal, and
   (f) third means for alternatively supplying said reference signal to said record/playback head or supplying an output signal from said record/playback head as a control signal for said second means.

11. The system of claim 11 wherein said record/playback head has input and output terminals and said third means comprises a manually operable switch having at least first and second positions, said switch being arranged and connected such that when said switch is in said first position the output of said oscillator is connected to said input terminal of said head and when said switch is in said second position said output terminal of said head is connected to an input of said second means.

12. The system of claim 11 wherein said record/playback head comprises a magnetic member having a single gap between two ends thereof, said gap being placed adjacent said magnetic track, said member being wound with a coil having first and second end terminals and an intermediate terminal connected to a tap on said coil intermediate said end terminals, said first end terminal being a common terminal, said second end terminal being said output terminal, and said intermediate terminal being said input terminal.

13. The system of claim 10 wherein said second means comprises a frequency discriminator arranged to receive said control signal and provide an output signal whose amplitude is proportional to the frequency of said control signal, a variable duty cycle astable multivibrator coupled to the output of said discriminator and arranged to supply a pulse wave wherein the duty cycle of a set of pulses thereof is proportional to the amplitude of said output signal of said discriminator, a vacuum motor comprising a chamber having vacuum and atmospheric inlets, one part of said chamber comprising a bellows, one part of which is connected to said throttle, said bellows arranged to adjust the position of said throttle in accordance with the degree of vacuum in said chamber, said vacuum motor including a control member having first and second positions and arranged to alternatively open said atmospheric or said vacuum inlets in said first and second positions, respectively, and a magnetic member having a coil wound thereon and arranged to alternatively position said control member to its first and second positions in response to a pulse signal applied to said coil, the output of said variable duty cycle multivibrator being supplied to said coil.

14. In combination:
   (a) a frequency discriminator arranged to receive, at an input terminal thereof, an alternating signal, said discriminator having at least one output terminal and arranged to supply, at said output terminal, a direct voltage proportional to the frequency of said alternating signal, and (b) an astable multivibrator comprising two capacitively cross-coupled signal inverting elements, each of said inverting elements having an input terminal, a common terminal, and an output terminal; and means for changing the direct voltage between the input and common terminals of one of said inverting elements with respect to the corresponding direct voltage of the other of said inverting elements in response to changes in the direct output voltage of said discriminator, whereby frequency variations in said alternating signal will produce corresponding variations in the duty cycle of said multivibrator.

15. The combination of claim 14 wherein said means of clause (b) for changing the direct voltage between the input and common terminals includes a voltage sensitive impedance coupling said output terminal of said discriminator to an input terminal of one of said inverting elements of said astable multivibrator.

16. The combination of claim 14 wherein said discriminator has two output terminals connected to the respective input terminals of said inverting elements of said multivibrator.

17. The combination of claim 15 further including a linear motor comprising a vacuum chamber, a bellows attached to said vacuum chamber, said bellows arranged to adjust the position of a load member in accordance with the degree of vacuum in said chamber, said chamber having vacuum and atmospheric ports, a valve member capable of assuming first and second positions respectively arranged to open alternatively said vacuum and said atmospheric ports, and a magnetic member wound with a coil connected to an output of said multivibrator, whereby the position of said load member will be adjusted according to the duty cycle of said multivibrator and hence the frequency of said alternating signal.

18. In combination:
   (a) a frequency discriminator comprising a transformer having a tuned primary and a tuned centertapped secondary, a pair of diodes, one terminal of each being connected to the respective end terminals of said secondary winding, the other terminal of each being connected, via a respective pair of load impedances, to the centertap of said secondary winding, a pair of capacitors respectively connected from said other terminals of said diodes to a point at reference potential,
   (b) means for supplying an alternating input voltage (1) to said primary, and (2) between the centertap of said secondary and a point at reference potential,
   (c) an astable multivibrator comprising two transistor inverting circuits, an output of each being capacitively coupled to an input of the other, each having a common terminal connected to said point at reference potential, and
   (d) a pair of voltage-sensitive impedance elements, each connected between said other terminal of one of said diodes and an input terminal of one of said inverting elements.

19. The combination of claim 18 further including means, coupled to an output of said multivibrator, for adjusting the position of a member in accordance with the duty cycle of said multivibrator.

References Cited
UNITED STATES PATENTS

| | | | |
|---|---|---|---|
| 2,576,424 | 11/1951 | Sunstein | 246—63 |
| 2,783,426 | 2/1957 | Pittman | 318—171 |
| 2,828,459 | 3/1958 | Pear | 318—318 |
| 2,848,610 | 8/1958 | Freienmuth | 331—144 X |
| 2,913,652 | 11/1959 | Greenberg et al. | 318—314 X |
| 3,088,538 | 5/1963 | Brennan et al. | 180—82.1 |
| 3,089,061 | 5/1963 | Nieuweboer | 318—318 X |
| 3,292,105 | 12/1966 | Den Brinker | 331—113 |

KENNETH H. BETTS, *Primary Examiner.*